Oct. 28, 1969  C. S. WARREN ET AL  3,475,670
CONTROL CIRCUIT
Filed Sept. 12, 1966
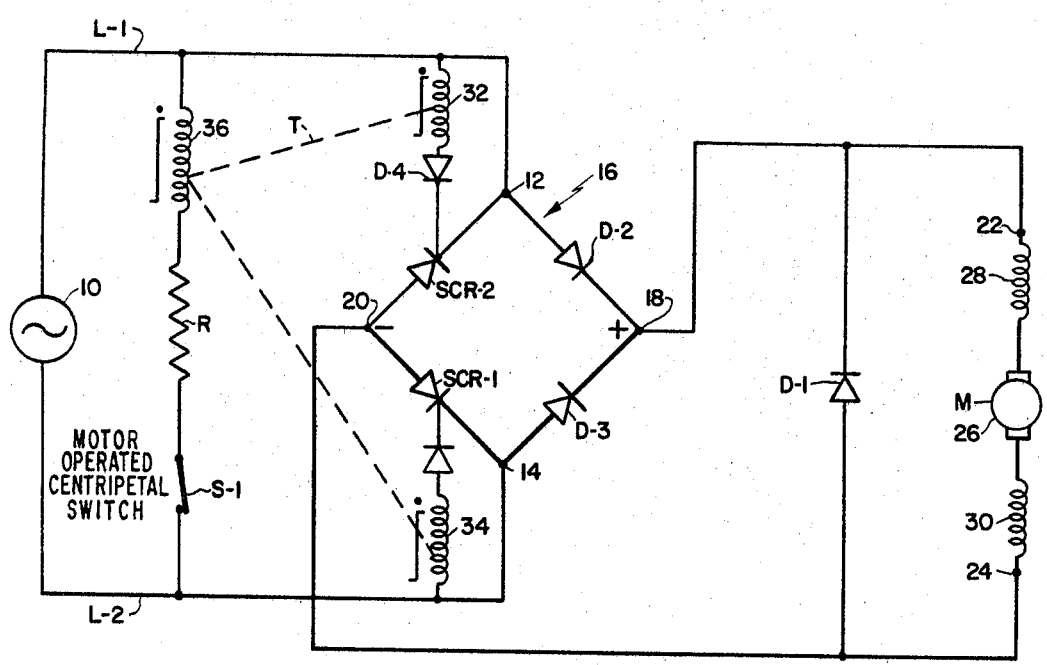
INVENTORS
CREIGHTON S. WARREN
GEORGE E. MISTHOS
BY
Strauch, Nolan, Neale, Nies & Bronaugh
ATTORNEYS 3,475,670
CONTROL CIRCUIT
Creighton S. Warren, Chicago, and George E. Misthos, Glenview, Ill., assignors to SCM Corporation, New York, N.Y., a corporation of New York
Filed Sept. 12, 1966, Ser. No. 578,610
Int. Cl. H02p 5/06, 7/06
U.S. Cl. 318—246      6 Claims

ABSTRACT OF THE DISCLOSURE

A circuit to control speed of a series universal motor at a constant value. An A.C. source is applied through a full wave rectifier to the series wound motor input terminals. Two of the rectifiers in the bridge are silicon controlled rectifiers, the gates of which alternately receive gating bias through transformer secondary coils of a transformer whose primary is in a circuit shunted across the A.C. input lines and including a voltage limiting resistor and a motor operated centripetal switch.

---

The present invention relates to improvements in motor control circuit and more particularly to motor control circuits for series universal motors operative to maintain constant motor speeds while the motor is operational. In the past, centrifugally actuated switches connected for actuation in response to motor speed have been utilized to control the conduction of silicon controlled rectifiers in full wave bridge rectifier circuits interposed between the motor and a power source to maintain the motor speed substantially constant at a preselected level. An example of such a prior art circuit will be found in Seiler et al. United States Patent 3,223,911 issued Dec. 14, 1965 for "Motor Speed Control System." The acceptable reverse bias between the gate and cathode of silicon controlled rectifiers is usually limited to about five volts. In the prior art circuits of the type illustrated in the Seiler et al. patent the reverse bias between the gate and cathode of the silicon controlled rectifiers may well exceed this value in operation and thereby cause extensive damage to the circuit.

The present invention provides a novel circuit arrangement whereby excessive reverse bias voltage between the gate and cathode of the silicon controlled rectifiers in the full wave bridge rectifier circuit is precluded by the provision of a low impedance D.C. path when the cathode of either silicon controlled rectifier is positive with respect to its gate. To provide such a circuit is the basic object of the present invention.

The foregoing and other objects of the present invention will become more fully apparent by reference to the appended claims and as the detailed description proceeds in reference to the accompanying drawing in which the single figure illustrates schematically the motor control circuit of the present invention.

Referring now to the drawing in detail, power is supplied from any conventional source as indicated by the generator 10 through the input lines L–1 and L–2. Conventionally the source 10 will be a source of 115 volt RMS 400 cycle per second alternating current. Lines L–1 and L–2 are connected to the input terminals 12 and 14 of a full wave rectifier bridge circuit 16. The output terminals 18 and 20 of the bridge circuit 16 are connected to the input terminals 22 and 24 of the motor M. The motor M is a series universal motor having a rotatable armature 26 and field windings 28 and 30.

A diode D–1 is connected across the output terminals 18 and 20 of the bridge circuit 16 and the input terminals 22 and 24 of the motor M to provide a low impedance path for any voltage induced by the motor M upon termination of power input thereto thereby preventing any reverse bias upon the output terminals 18 and 20 of the bridge circuit 16 induced by the motor M.

The bridge output terminal 18 is connected to line L–1 and input terminal 12 by a diode D–2 and to the line L–2 and input terminal 14 by a diode D–3. Similarly the output terminal 20 is connected to the line L–1 and input terminal 12 through a solid state controlled rectifier SCR–2 and to the line L–2 and input terminal 14 through a solid state controlled rectifier SCR–1. The solid state controlled rectifiers SCR–1 and SCR–2 are, in their preferred form, silicon controlled rectifiers.

The gate of controlled rectifier SCR–2 is connected to line L–1 through a diode D–4 and a secondary winding 32 of a square loop core transformer T. The gate of controlled rectifier SCR–1 is connected to the line L–2 through the other secondary swinding 34 of the transformer T.

The primary winding 36 of the transformer T is connected in series with a resistor R and a centripetal switch S–1 between the lines L–1 and L–2. Switch S–1 is normally closed (as shown) and is opened only when the speed of the armature 26 of the motor M equals or exceeds a predetermined speed. So long as switch S–1 is closed, alternating current is applied to the primary winding 36 of the transformer T to thereby induce alternating currents in the secondary windings 32 and 34. Windings 32 and 34 are so coupled to the primary winding 36 that when line L–1 is positive with respect to line L–2, the gate of controlled rectifier SCR–1 is positive with respect to its cathode so that current flows from line L–1 to input terminal 12, through diode D–2 to output terminal 18 through the motor M to output terminal 20, through the controlled rectifier SCR–1 to input terminal 14 to line L–2. Similarly the coupling of winding 32 to winding 36 is such that when line L–2 is positive with respect to line L–1, the gate of controlled rectifier SCR–2 is positive with respect to its cathode and current flows from line L–2 to input terminal 14, through diode D–3 to output terminal 18, through motor M to output terminal 20, through controlled rectifier SCR–2 to input terminal 12 and line L–1.

As is apparent, by this arrangement, the bias applied between the gate and cathode of each of the two controlled rectifiers SCR–1 and SCR–2 is merely that induced in the secondary windings 32 and 34 which may be maintained at an acceptably low level to permit the required switching to effect alternative operation of the controlled rectifiers SCR–1 and SCR–2 with the reversal of polarity of the voltage applied to the primary winding 36 while maintaining the reverse bias on the inoperative one of the controlled rectifiers SCR–1 or SCR–2 at or below the five volt limit required.

In this circuit, the contacts of the centripetal switch S–1 are completely isolated from the current flowing to the motor M so that those contacts are not destroyed by arcing as the switch S–1 is opened and closed.

So long as the speed of the motor M remains below the predetermined value set by adjustment of the centripetal switch S–1, the switch S–1 will remain closed and power will be applied to the motor M from the output terminals 18 and 20 of the full wave rectifier circuit 16. When the speed of the motor M reaches the predetermined magnitude, the switch S–1 will open thereby terminating power input to the primary winding 36, rendering the controlled rectifiers SCR–1 and SCR–2 non-conductive and terminating power input to the motor M. When the motor speed reduces to the predetermined magnitude, centripetal switch S–1 will again close, restoring power input to the primary winding 36 and operation of the bridge 16 to supply power to the motor M.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes will come within the meaning and range of equivalency of the claims are therefore intended to be embraced therein.

What is claimed and desired to be secured by Letters Patent is:

1. In a motor speed control system: a source of alternating current; a full wave bridge rectifier having input and output terminals, with said source connected to said input terminals; a motor connected to said output terminals; said bridge rectifier including a pair of diodes in two adjacent legs, a pair of solid state controlled rectifiers in the other two legs and each controlled rectifier having an anode, a cathode and a gate; means connected to said gates for controlling the alternative conduction of said control rectifiers comprising: a square loop core transformer having a transformer primary winding, and a speed responsive switching device connected in series across such source, said switching device being connected to and actuated in response to the speed of said motor, said square loop core transformer having a pair of transformer secondary windings each inductively coupled to said primary winding, one of said secondary windings being connected between the gate of one of said controlled rectifiers and one of said input terminals and the other of said secondary windings being connected between the gate of the other of said control rectifiers and the other of said input terminals, the coupling of said secondary windings to said primary windings being such that said controlled rectifiers are rendered conductive alternatively during appropriate phase periods of said source current.

2. The system defined in claim 1 wherein a resistance element is interposed in series with said speed responsive switching device and said primary winding.

3. The system defined in claim 1 wherein said speed responsive switching device is a centripetal switch driven by said motor.

4. The system defined in claim 1 further comprising a diode rectifier connected in series with one of said secondary windings between the associated gate and bridge input terminal.

5. The system defined in claim 1 further comprising a diode rectifier connected in parallel with said motor to isolate said bridge from current induced by said motor upon termination of the power input to said motor from said bridge output terminals.

6. The system defined in claim 1 wherein said motor is a series universal motor.

References Cited

UNITED STATES PATENTS 3,223,911  8/1962  Seiler et al. _____ 318—325
3,325,710  6/1967  Reynolds _____ 318—345

ORIS L. RADER, Primary Examiner

K. L. CROSSON, Assistant Examiner

U.S. Cl. X.R.
318—325, 341